United States Patent [19]
Götz et al.

[11] Patent Number: 5,195,799
[45] Date of Patent: Mar. 23, 1993

[54] CONVERTIBLE WINDSCREEN

[75] Inventors: Hans Götz, Böblingen; Karl-Heinz Baumann, Bondorf, both of Fed. Rep. of Germany

[73] Assignee: Mercedes-Benz, Fed. Rep. of Germany

[21] Appl. No.: 797,979

[22] Filed: Nov. 26, 1991

[30] Foreign Application Priority Data

Nov. 27, 1990 [DE] Fed. Rep. of Germany ....... 4037704

[51] Int. Cl.$^5$ .............................................. B62D 25/00
[52] U.S. Cl. ...................................... 296/180.1; 296/85
[58] Field of Search ...................... 296/180.1, 180.5, 85

[56] References Cited

U.S. PATENT DOCUMENTS

| | | | |
|---|---|---|---|
| 2,573,789 | 11/1951 | Gale | 296/85 |
| 2,641,502 | 6/1953 | Gunion et al. | 296/85 |
| 4,767,147 | 8/1988 | Kobayakawa et al. | 296/180.1 |

FOREIGN PATENT DOCUMENTS 8805994 9/1988 Fed. Rep. of Germany.
3914035 4/1990 Fed. Rep. of Germany.

*Primary Examiner*—Robert R. Song
*Attorney, Agent, or Firm*—Evenson, Wands, Edwards Lenahan & McKeown

[57] ABSTRACT

A convertible has a windscreen arranged behind a row of seats and extending upwards in the operating position approximately perpendicularly between two adjustable side panes. The panes are height-adjustable on a path which is curved with respect to the vehicle passenger compartment and can be lowered into an out-of-use position in the direction of the vehicle floor. The panes are also adjustable with auxiliary force actuation, and an entrainer which acts between a side pane and the windscreen is arranged on at least one of the side panes. By means of the entrainer, the position of the windscreen can be changed in accordance with the movement of the side pane. Thus, it is possible to compensate the transverse path of the side pane with respect to the windscreen by way of the entrainer.

5 Claims, 2 Drawing Sheets

CONVERTIBLE WINDSCREEN

BACKGROUND AND SUMMARY OF THE INVENTION

The present invention relates to a convertible having a windscreen which is arranged behind a row of seats and, more particularly to a convertible whose windscreen extends upwards in the operating position approximately perpendicularly between two adjustable side panes that are height-adjustable on a curved path.

DE-GM 88 05 994 discloses an open-top motor vehicle which has a device which is intended to reduce air streams in the front seat area. For this purpose, a partition which occupies the internal cross-section of the vehicle is provided behind the front seats. This windscreen is constructed as a roller blind which can be pulled out upwards from an out-of-use position lowered to the vehicle floor into an operating position. The windscreen is suspended in its end position either on a cross bar of a roll bar or suspended on the rear of the front seat or on rear side panes which are height-adjustable along a curved path in the transverse direction of the vehicle.

This windscreen has to be placed into its end position and locked manually. If during the journey the air streams should become too unpleasant for the driver of the vehicle, the driver must first stop the motor vehicle since securing the windscreen during the journey requires too much attention. The end position of the windscreen in its operating position is fixed and, for visual reasons, matched to the level of the roll bar or of the front seats.

An object of the present invention is to provide a windscreen, arranged behind a row of seats of a convertible, with auxiliary force actuation using an actuator present in the vehicle and of making it individually height-adjustable.

The object has been achieved by making the side panes adjustable with auxiliary force activation, and providing an entrainer acting between a side pane and the windscreen. The entrainer is arranged on at least one of the side panes. By virtue of the entrainer, the position of the windscreen can be changed in accordance with movement of the side pane so as to compensate the transverse path of the side pane relative to the windscreen.

An entrainer on the rear auxiliary force-actuated moveable side panes causes the windscreen to be moved in accordance with the movement of at least one side pane. As a result, any person who has access to the operating switches of the side panes can influence the desired operating position of the windscreen. Since these operating switches are normally easy to reach also for the driver of the vehicle on a center console, the windscreen can be moved up without difficulty into its operating position without distracting the driver even when driving. An additional drive is dispensed with by using the driven side panes. If the air streams are not unpleasant for the vehicle occupants even with the side panes opened, the windscreen is lowered at the same time in order to improve the visual appearance of the convertible.

The necessary entrainer on the side pane which has to compensate the curved path of the pane with respect to the windscreen can be configured as an elastic belt, a telescopic tube or similar. The upper end of the windscreen roller blind is securely wound around the entrainer or else the entrainer rests against a sturdy windscreen frame with which it moves together. An entrainer which projects away from the side pane and engages on the windscreen frame during the movement of the pane can also be utilized with a windscreen frame.

If the entrainer can be removed from the side panes, the windscreen may optionally not be moved together with the side panes or need only be installed in the place provided between the side panes when required. There are numerous, generally known alternatives for detachably securing the entrainer without departing from the scope of the present invention.

Windscreen embodiments such a roller blind or a pivotable windscreen frame are already known. The aforesaid entrainers can be used in such embodiments. If the lower edge of the windscreen only begins at the level of the upper edge of the vehicle, sufficient legroom remains for the vehicle occupants sitting behind it.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
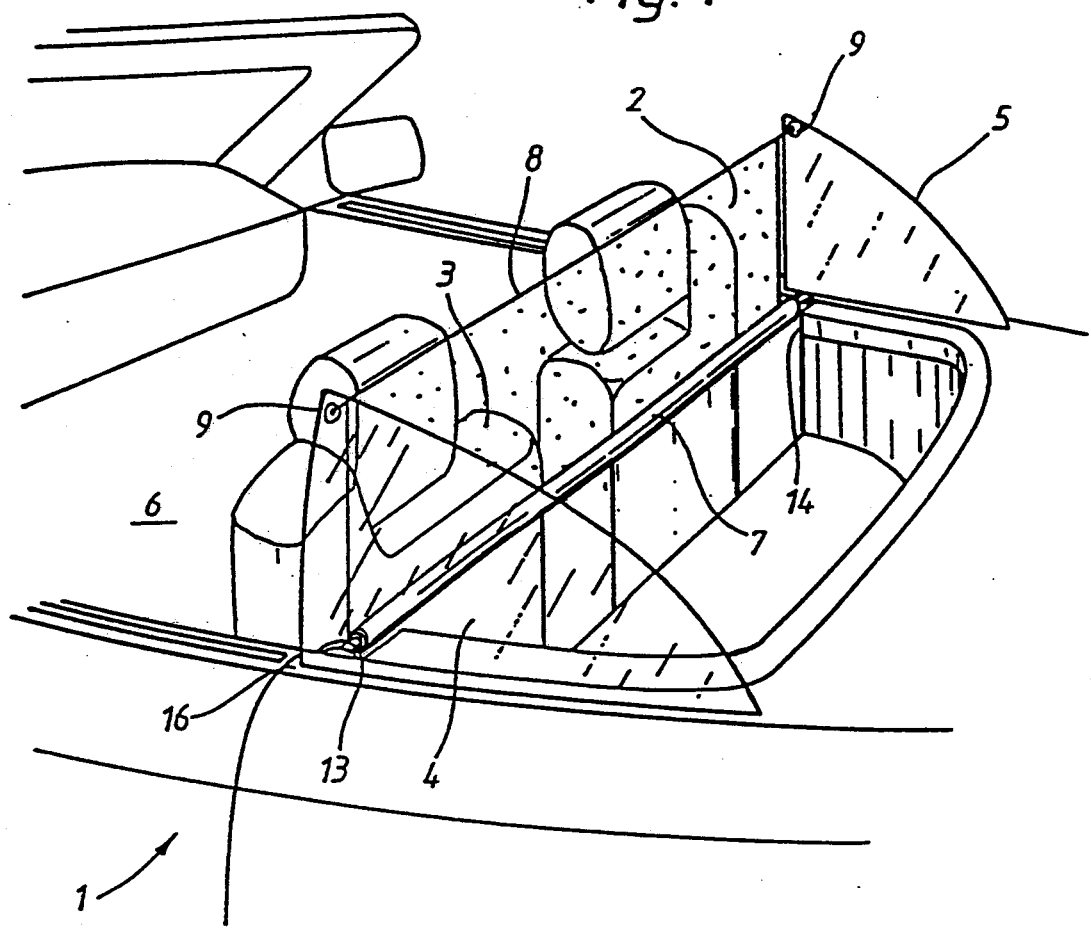
FIG. 1 is a perspective view of a rear area of a convertible with a roller blind as a windscreen, raised into the operating position by the side panes by an elastic belt.

In FIG. 1, a rear area of a convertible 1 is illustrated in which a windscreen 2 is arranged behind a row of seats 3. This windscreen 2 is shown in its operating position in which it extends upwards approximately perpendicularly between two side panes 4,5 and protects the vehicle passenger compartment 6 lying in front of its from air swirls. When not in use, the windscreen 3, which is constructed as a roller blind, can be lowered downwardly in the direction of the vehicle floor. The roller blind 3 is wound up automatically with a spring support onto a winding-up roller 7.

The side panes 4,5 are height-adjustable with auxiliary force actuation by a conventional drive (not illustrated) and at the same time entrain the windscreen 3 by way of an entrainer 8. The entrainer 8 is configured as an elastic belt which is detachably fixed, by way of a suction device 9, to an upper end of each side pane 4, 5, and is secured around the upper end of the windscreen 3. The entrainer 8 can compensate, by virtue of its elasticity, for the transverse path of the side panes 4, 5 occurring during the movement of the side panes 4,5 along a curved path.

Figure 2:
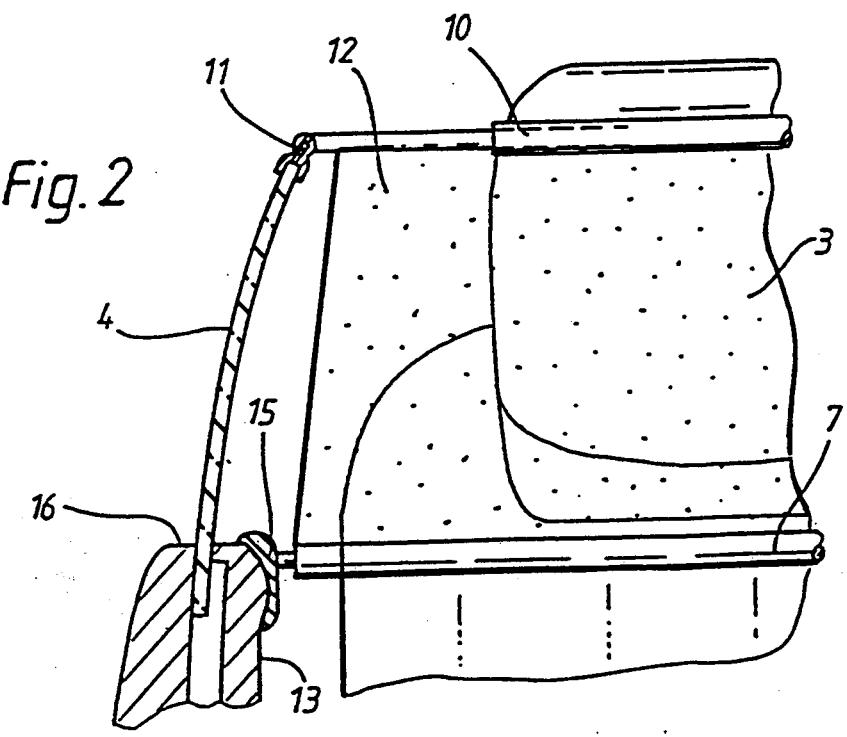
FIG. 2 is an elevational view of a roller blind which is secured to the side panes by a telescopic rod.

FIG. 2 shows a different entrainer 10 which is configured as a telescopic tube. The entrainer 10 is installed between the two side panes 4, 5 by two securing joints 11, and the upper end of a roller-like windscreen 12 is in turn secured around the entrainer 10. The securing joints 11 are detachably attached to the side panes 4, 5. The winding-up roller 7 is also detachably secured between the side walls 13, 14 of the body, in spring-loaded fashion in the direction of the body walls, via one clamping piece 15 in each case. In this way, the windscreen 12 can be removed from the vehicle without great effort.

The spring-supported winding-up roller 7 is arranged approximately at the level of the upper edge 16 of the convertible 1, as a result of which the legroom of a person sitting behind the windscreen is not restricted. During movement of the side panes 4, 5, the windscreen 12 is also moved and the transverse path of the side panes 4,5 is compensated for without resistance by the outer tubes of the telescopic tube which can be displaced with respect to one another. For this purpose, it is convenient that the two side panes 4, 5 are simultaneously actuated and moved synchronously with one another so that the upper end of the windscreen 12 is displaced approximately horizontally.

Figure 3:
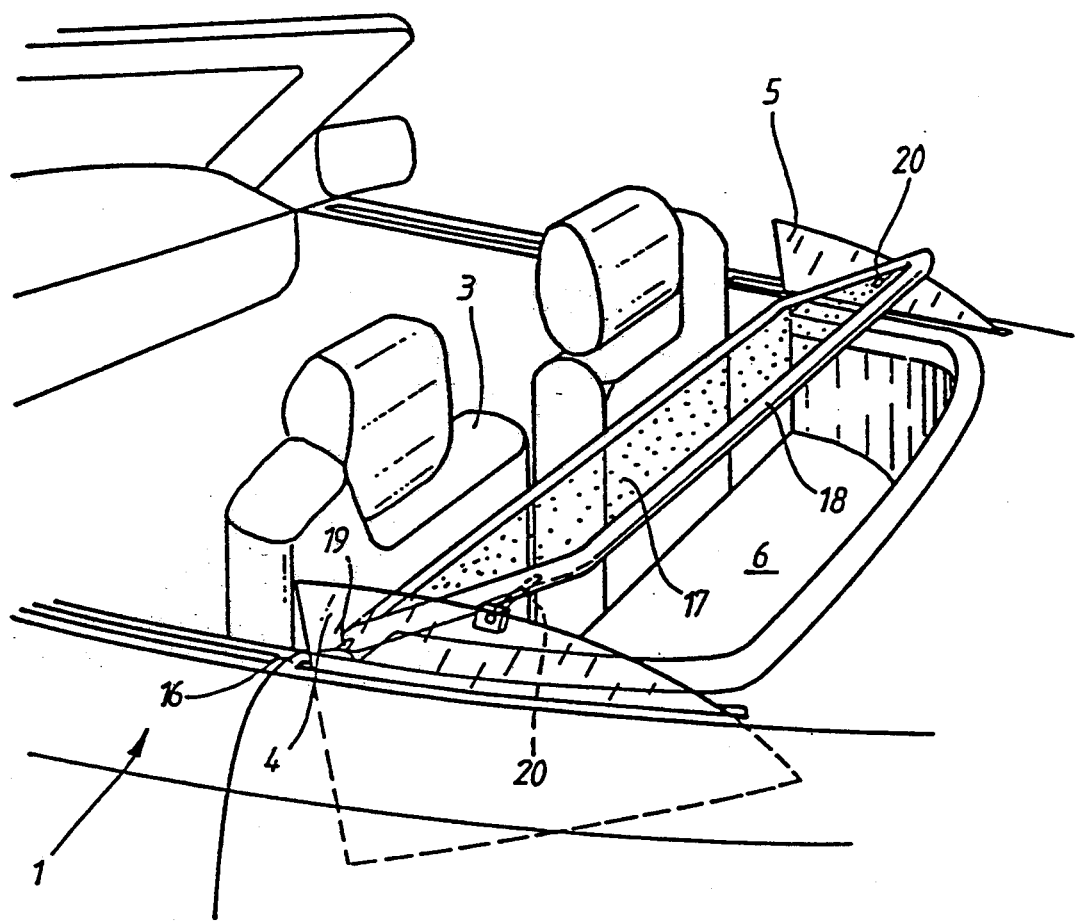
FIG. 3 is a perspective view similar to FIG. 1 but showing a windscreen with a frame which is folded upwards by a entrainer which projects away from a side pane.

In FIG. 3, another embodiment of a windscreen 17 is illustrated in which a rigid windscreen frame 18 can be folded upwards and lowered horizontally towards the rear about a swivel axis 19. The swivel axis 19 is located, in turn, approximately at the level of the upper edge 16 of the convertible 1. A bolt-shaped entrainer 20 which projects away from, i.e. the side panes 4.5 is secured to the side panes in the direction of the vehicle passenger compartment 6 and is attached to the side panes 4, 5 by a U-shaped receptacle. The entrainer 20 engages behind the windscreen frame 18 and entrains the latter during the movement of the side panes 4,5 or supports it during the lowering of the windscreen 17. The windscreen frame 18 slides during the transverse movement of the side panes 4,5 along the bolt-shaped entrainers. It is also contemplated that only one entrainer 20 on a side pane 4 or 5 may be needed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A convertible having two adjustable side panes, a windscreen arranged behind a row of seats and extending upwardly in an operating position approximately perpendicularly between the two adjustable side panes which are height-adjustable with auxiliary force actuation on a path which is curved with respect to the vehicle passenger compartment and can be lowered into an out-of-use position toward a floor of the convertible, and a telescopic tube entrainer operatively connected for transverse movement between the side panes and the windscreen arranged on at least one of the side panes such that the position of the windscreen can be changed in accordance with the movement of the at least one side pane to compensate for the correct path of the side pane with respect to the windscreen, wherein the telescopic tube entrainer is operatively configured to move the windscreen therewith and is secured in an articulated manner to the two side panes.

2. The convertible according to claim 1, wherein the two side panes are operatively arranged to be actuated simultaneously and moved synchronously.

3. The convertible according to claim 1, wherein the entrainer is detachably secured to the side panes.

4. The convertible according to claim 1, wherein the telescopic tube is clamped in spring-loaded fashion between the side panes.

5. The convertible according to claim 4, wherein the entrainer is detachably secured to the side panes.

* * * * *